United States Patent
Yu et al.

(10) Patent No.: US 12,112,414 B2
(45) Date of Patent: Oct. 8, 2024

(54) METHOD, APPARATUS, ELECTRONIC DEVICE, AND COMPUTER-READABLE MEDIUM FOR DISPLAYING SPECIAL EFFECTS

(71) Applicant: BEIJING BYTEDANCE NETWORK TECHNOLOGY CO., LTD., Beijing (CN)

(72) Inventors: Yan Yu, Beijing (CN); Sen Zhao, Beijing (CN); Lei Sun, Beijing (CN); Tao Li, Beijing (CN); Jia Qu, Beijing (CN)

(73) Assignee: BEIJING BYTEDANCE NETWORK TECHNOLOGY CO., LTD. (CN)

( * ) Notice: Subject to any disclaimer, the term of this patent is extended or adjusted under 35 U.S.C. 154(b) by 101 days.

(21) Appl. No.: 17/438,782

(22) PCT Filed: Jun. 18, 2021

(86) PCT No.: PCT/CN2021/100851
§ 371 (c)(1),
(2) Date: Sep. 13, 2021

(87) PCT Pub. No.: WO2022/083148
PCT Pub. Date: Apr. 28, 2022

(65) Prior Publication Data
US 2022/0309723 A1  Sep. 29, 2022

(30) Foreign Application Priority Data
Oct. 20, 2020 (CN) .......................... 202011126426.3

(51) Int. Cl.
*G06T 13/00* (2011.01)
*G06T 11/00* (2006.01)
(Continued)

(52) U.S. Cl.
CPC ............ *G06T 13/00* (2013.01); *G06T 11/001* (2013.01); *G10H 1/0008* (2013.01); *G10H 1/368* (2013.01);
(Continued)

(58) Field of Classification Search
None
See application file for complete search history.

(56) References Cited

U.S. PATENT DOCUMENTS 8,088,985 B1 * 1/2012 Bowser ................ G10H 1/0008
84/477 R
2008/0055469 A1 * 3/2008 Miyasaka .............. G11B 27/28
348/521
(Continued)

FOREIGN PATENT DOCUMENTS

CN   104103300 A   10/2014
CN   107967706 A   4/2018
(Continued)

OTHER PUBLICATIONS

International Patent Application No. PCT/CN2021/100851, International Search Report mailed Nov. 17, 2021, 5 pages.
(Continued)

*Primary Examiner* — Hilina K Demeter

(57) ABSTRACT

The disclosure provides a method, an apparatus, an electronic device, and a computer readable medium for displaying special effects and relates to the technical field of special effect display. The method includes: obtaining musical features of music played in a special effect display interface; and displaying special effects on the special effect display interface based on the musical features. In the embodiment of the present disclosure, by obtaining musical features of music, and displaying special effects generated based on the musical features on the special effect display interface, the change of the display of the special effects is associated to (Continued)

Obtaining musical features of background music played in a special effect display interface — S101

Displaying special effects on the special effect display interface based on the musical features — S102 the musical features, the display of the special effect is more diverse, and the special effects is combined with the musical features, thereby increasing the user's immersive experience.

19 Claims, 6 Drawing Sheets

(51) Int. Cl.
  *G10H 1/00* (2006.01)
  *G10H 1/36* (2006.01)
(52) U.S. Cl.
  CPC . *G10H 2210/051* (2013.01); *G10H 2210/076* (2013.01); *G10H 2220/005* (2013.01)

(56) References Cited

U.S. PATENT DOCUMENTS

| | | | |
|---|---|---|---|
| 2009/0114079 A1* | 5/2009 | Egan | G09B 15/023 |
| | | | 84/477 R |
| 2010/0080532 A1* | 4/2010 | Ubillos | G11B 27/10 |
| | | | 386/241 |
| 2013/0203492 A1* | 8/2013 | Yum | A63F 13/44 |
| | | | 463/31 |
| 2013/0330062 A1* | 12/2013 | Meikle | H04N 21/8113 |
| | | | 386/285 |
| 2016/0252884 A1* | 9/2016 | Brewer | G10H 1/0016 |
| | | | 84/484 |
| 2017/0047082 A1 | 2/2017 | Lee et al. | |
| 2017/0105081 A1* | 4/2017 | Jin | G10H 1/368 |
| 2017/0278497 A1* | 9/2017 | Nedelman | G10H 1/0008 |
| 2018/0047372 A1* | 2/2018 | Scallie | G06F 3/04815 |
| 2018/0374462 A1* | 12/2018 | Steinwedel | G10H 1/366 |
| 2019/0335229 A1 | 10/2019 | Wang et al. | |
| 2020/0286454 A1* | 9/2020 | Kafuku | G10H 1/0066 |

FOREIGN PATENT DOCUMENTS

| | | |
|---|---|---|
| CN | 108877838 A | 11/2018 |
| CN | 108986842 A | 12/2018 |
| CN | 108989706 A | 12/2018 |
| CN | 110278388 A | 9/2019 |
| CN | 110769309 A | 2/2020 |
| CN | 111399745 A | 7/2020 |
| CN | 112259062 A | 1/2021 |

OTHER PUBLICATIONS

"Follow YUEMING Talks on Technology, and watch the tutorial videos" (2020) Video [online] website: https://haokan.baidu.com/v?vid=5620849187003461595; English transcription submitted herewith.
Second Office Action issued May 6, 2022 in Chinese Patent Application No. 202011126426.3 (6 pages) with an English translation (8 pages).
Third Office Action issued Jul. 26, 2022 in Chinese Patent Application No. 202011126426.3 (4 pages) with an English translation (3 pages).
First Office Action issued Feb. 15, 2022 in Chinese Patent Application No. 202011126426.3 (10 pages) with English translation (7 pages).
Office Action received for ID Patent Application No. P00202107543, mailed on Dec. 14, 2023, 6 pages (3 pages of English Translation and 3 pages of Original Document).
Office Action received for Indian Patent Application No. 202127041243, mailed on Jan. 4, 2024, 6 pages (including English translation).
European Search Report for EP Patent Application No. 21881569.4, Issued on Apr. 16, 2024, 8 pages.

\* cited by examiner

METHOD, APPARATUS, ELECTRONIC DEVICE, AND COMPUTER-READABLE MEDIUM FOR DISPLAYING SPECIAL EFFECTS

CROSS-REFERENCE TO RELATED APPLICATION

The present application is a U.S. 371 Application of International Patent Application No. PCT/CN2021/100851, filed on 18 Jun. 2021, which application claims priority to Chinese Patent Application No. 202011126426.3, titled "METHOD, APPARATUS, ELECTRONIC DEVICE, AND COMPUTER-READABLE MEDIUM FOR DISPLAYING SPECIAL EFFECTS", filed on Oct. 20, 2020, the entire contents of which are incorporated herein by reference.

FIELD

The present disclosure relates to the technical field of special effect display. Specifically, the present disclosure relates to a method, an apparatus, an electronic device, and a computer-readable medium for displaying special effects.

BACKGROUND

A lot of music player software on the market now has a function of displaying special effects when playing music, allowing users to enjoy visual effects while listening to music, thereby enhancing user experience.

In the existing special effect display, the variability of special effects is not strong. The animation elements of the special effects are all fixed templates. The special effects are also displayed according to a specific rhythm, which makes the special effects appear relatively dull when being displayed, and cannot give users more visual experience in the process of listening to music, resulting poor user experience.

It can be seen that in the existing special effect display technology, the special effect elements are relatively fixed, and the variability of the special effect display is not strong, resulting in poor user experience, so there is a need for improvement.

SUMMARY

The purpose of the present disclosure is to at least solve one of the above technical defects, especially the technical defects of the special effect elements being relatively fixed, and the variability of the special effect display being not strong in the existing special effect display technology, which leads to poor user experience.

In the first aspect, a special effect display method is provided, including: obtaining musical features of music played in a special effect display interface; and displaying special effects on the special effect display interface based on the musical features.

In the second aspect, a special effects display apparatus is provided, including: a musical feature obtaining module configured to obtain musical features of music played in a special effect display interface; and a special effect displaying module configured to display special effects on the special effect display interface based on the musical features.

In the third aspect, an electronic device is provided, including: a processor; and a memory having at least one instruction, at least one segment program, a code set, or an instruction set stored thereon. The at least one instruction, the at least one segment program, the code set, or the instruction set is loaded and executed by the processor to implement the above special effect display method.

In the fourth aspect, a computer-readable storage medium is provided, the computer-readable storage medium having a computer program stored thereon, the computer program, when executed by a processor, implementing the above special effect display method.

In the embodiments of the present disclosure, by obtaining musical features of music, and displaying, on the special effect display interface, special effects generated based on the musical features, the change of the special effect display is related to the musical features, the special effect display is more diverse, and the special effects are combined with the musical features, which increases the user's immersive experience.

BRIEF DESCRIPTION OF DRAWINGS

In order to more clearly illustrate the technical solutions in the embodiments of the present disclosure, the drawings that need to be used in the description of the embodiments of the present disclosure will be briefly introduced below.

Figure 1:
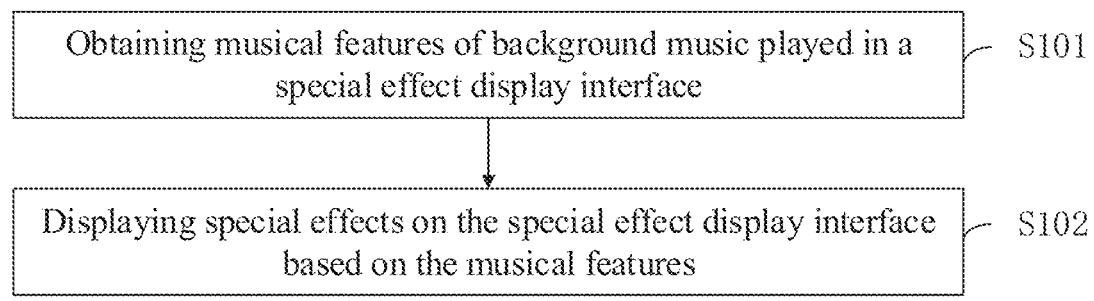
FIG. 1 is a schematic flowchart of a special effect display method provided by an embodiment of the present disclosure.

The above and other features, advantages, and aspects of the embodiments of the present disclosure will become more apparent in conjunction with the accompanying drawings and with reference to the following specific implementations. Throughout the drawings, the same or similar reference numerals indicate the same or similar elements. It should be understood that the drawings are schematic and the components and elements are not necessarily drawn to scale.

DESCRIPTION OF EMBODIMENTS

Hereinafter, embodiments of the present disclosure will be described in more detail with reference to the accompanying drawings. Although some embodiments of the present disclosure are illustrated in the drawings, it should be understood that the present disclosure can be implemented in various forms and should not be construed as being limited to the embodiments set forth herein. On the contrary, these embodiments are provided for a more thorough and complete understanding of this disclosure. It should be understood that the drawings and embodiments of the present disclosure are only configured for exemplary purposes, and are not configured to limit the protection scope of the present disclosure.

It should be understood that the various steps recorded in method implementations of the present disclosure may be executed in a different order, and/or executed in parallel. In addition, method implementations may include additional steps and/or omit to perform the illustrated steps. The scope of the present disclosure is not limited in this respect.

The term "including" and its variants as used herein are open-ended including, that is, "including but not limited to"; the term "based on" is "at least in part based on"; the term "one embodiment" means "at least one embodiment"; the term "another embodiment" means "at least one additional embodiment"; the term "some embodiments" means "at least some embodiments." Related definitions of other terms will be given in the following description.

It should be noted that the concepts of "first" and "second" mentioned in the present disclosure are only configured to distinguish apparatuses, modules or units, and are not configured to limit these apparatuses, modules or units to be different apparatuses, modules or units, and are not configured to limit the order or interdependence of the functions performed by these apparatuses, modules or units.

It should be noted that the definition with "a" or "a plurality of" mentioned in the present disclosure is illustrative and not restrictive. Those skilled in the art should understand that unless the context clearly indicates otherwise, it should be understood as "a or a plurality of".

The names of messages or information exchanged between a plurality of apparatuses in the implementations of the present disclosure are only configured for illustrative purposes, and are not configured to limit the scope of these messages or information.

The method, apparatus, electronic device, and computer-readable medium for displaying special effects provided by the disclosure are intended to solve the above technical problems in the related art.

The technical solutions of the present disclosure and how the technical solutions of the present disclosure solve the above technical problems will be described in detail below with specific embodiments. The following specific embodiments can be combined with each other, and the same or similar concepts or processes may not be repeated in some embodiments. The embodiments of the present disclosure will be described below in conjunction with the accompanying drawings.

An embodiment of the present disclosure provides a special effect display method, which is applied to a user terminal. The user terminal may be a device capable of playing multimedia files, such as a mobile phone, a tablet computer, or a smart watch, etc. As illustrated in FIG. 1, the method includes: step S101, obtaining musical features of music played in a special effect display interface; and step S102, displaying special effects on the special effect display interface based on the musical features.

The special effect display method provided by the embodiment of the present disclosure can be an APP (Application), or a functional module in the APP, which is configured to display special effects on the special effect display interface according to the musical features of the played music. The change of the special effect display is related to the musical features, the special effect display is more diverse, and the special effects is combined with the musical features to increase the user's immersive experience.

In the embodiment of the present disclosure, the musical features refers to rhythm features of the music, such as beats, accented beat points of the music, the amplitude of the beats, and the duration of the beats, etc., wherein the accented beat points are start points of the beats whose tones are higher than a preset threshold.

In the embodiment of the present disclosure, the special effect display interface is a user interface configured to display special effects, and may be the interface displayed when the user opens the APP or the special effect display module function in the APP. The special effect display interface can be opened to play pre-configured or user-selected music, and obtain musical features of the music; optionally, when obtaining the musical features of the music, the original audio data can be obtained by decoding by the player, and the original audio data can be decoded to obtain the musical features of the audio data; optionally, when processing the original audio data, a pre-configured special effect analysis SDK (Software Development Kit) can be used to analyze the original audio data to obtain the musical features in the original audio data, such as music beats, accented beat points, the amplitude of beats, the duration of beats, etc.

In an embodiment of the present disclosure, the special effects can be an animation element, e.g., one animation element or a combination of a plurality of animation elements being displayed on the special effect display interface, or a change in the color of the special effect display interface, e.g., a change of the colors of the special effect display interface according to musical features, or zooming of the special effect display interface, etc. Of course, the above plurality of categories can also be combined for display.

In the embodiments of the present disclosure, when displayed on the special effect display interface according to musical features, the above special effects can be randomly combined to ensure the diversity of the special effects.

Figure 2:
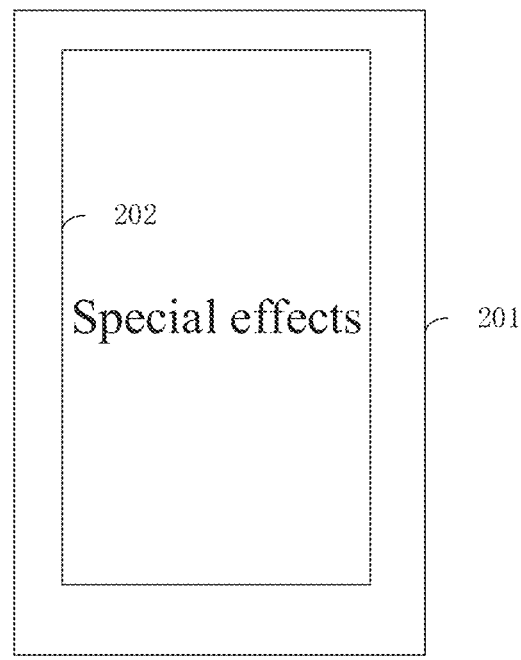
FIG. 2 is a schematic diagram of a special effect display interface provided by an embodiment of the present disclosure.

For the embodiments of the present disclosure, for convenience of description, a specific embodiment is taken as an example. As illustrated in FIG. 2, the user opens the special effect display interface 201 through the APP, the special effect display interface 201 has the special effects 202 displayed therein, music can be played in the special effect display interface 201, and the music may be pre-configured or user-selected; optionally, the operation of opening the special effect display interface 201 can be receiving an operation of selecting to play music by the user, based on which operation, the special effect display interface is opened, the user-selected music is played, the musical features of the music are extracted, and the special effects are displayed on the special effect display interface based on the musical features. Wherein, the musical features can be beats, accented beat points, amplitudes of the beats, and durations of the beats, etc. Based on the musical features, pre-configured animation elements, color changes, and the zooming of the interface are randomly combined to form the special effects for display.

In the embodiment of the present disclosure, by obtaining the musical features of music, and generating special effects based on the musical features for display on the special effect display interface, the change of the special effect display is related to the musical features, and by randomly combining the special effects, the special effect display is more diverse, and combining the special effects with the musical features increases the user's immersive experience.

The embodiment of the present disclosure provides a possible implementation manner. In this implementation manner, the musical features include beats of the music, and said displaying the special effects on the special effect display interface based on the musical features includes: playing the special effects at a start point of each of at least one beat of the music.

In the embodiment of the present disclosure, the musical features include the beats of the music, and displaying the special effects on the special effect display interface based on the musical features may include starting to play the special effects at the start point of each of at least one beat.

Figure 3:
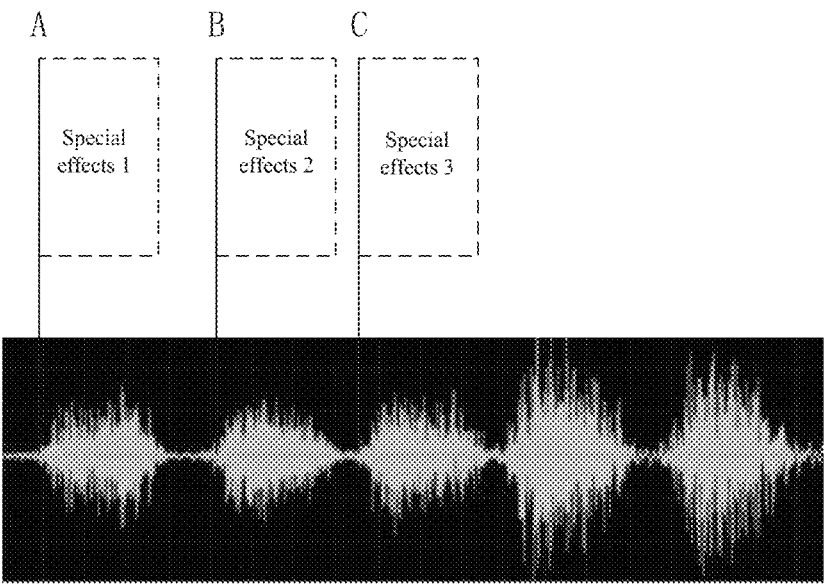
FIG. 3 is a schematic diagram of adding special effects at start points of beats provided by an embodiment of the present disclosure.

For the embodiments of the present disclosure, for convenience of description, a specific embodiment is taken as an example. In an audio diagram of certain music as illustrated in FIG. 3, the features of the music includes the start points A, B. and C of the beats; optionally, when being displayed based on the musical features, the special effects can start to be played at the start point of the beats. Optionally, as illustrated in FIG. 3, special effects 1 start to be played at the start point A of the beats, special effects 2 start to be played at the start point B of the beats, and special effects 3 start to be played at the start point C of the beats. Optionally, the special effects 1, special effects 2, and special effects 3 may be pre-configured animation effects or randomly-generated animation effects, such as appearance of a preset light spot, or appearance of a random combination of a plurality of light spots. The durations of the special effects 1, special effects 2, and special effects 3 may be preset time, or may be durations of the corresponding beats.

In the embodiments of the present disclosure, by playing special effects at the start point of the music beats, the appearance of the special effects corresponds to the start point of the beats, so that the rhythm is strong, the user experience is good. A variety of random combinations can be selected for the special effects, and thus the special effects are diverse.

The embodiment of the present disclosure provides a possible implementation manner. In this implementation manner, the musical features include start points of accented beats, and the method further includes: zooming out or zooming in on a content displayed on the special effect display interface at the start point of each of at least one accented beat of the music.

In the embodiment of the present disclosure, the musical features include start points of accented beats of the music. Displaying the special effects on the special effect display interface according to the musical features may includes zooming out or zooming in on the special effect display interface at the start point of each of at least one accented beat of the music.

Figure 4:
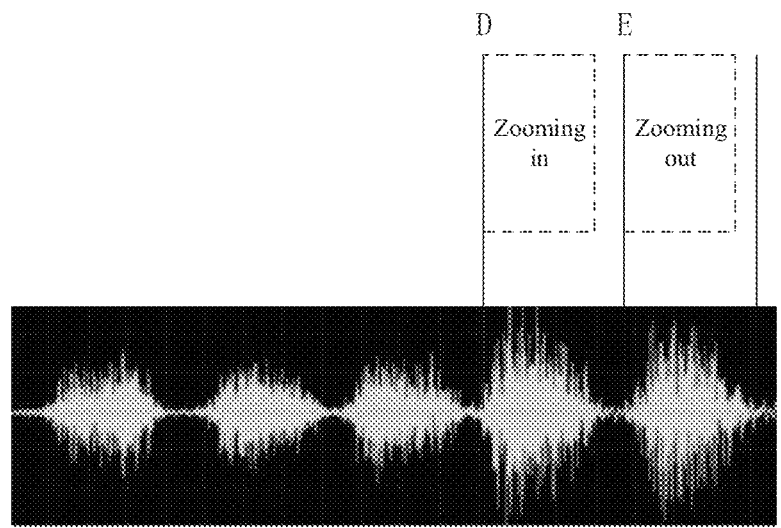
FIG. 4 is a schematic diagram of adding special effects at start points of accented beats provided by an embodiment of the present disclosure.
Figure 5:
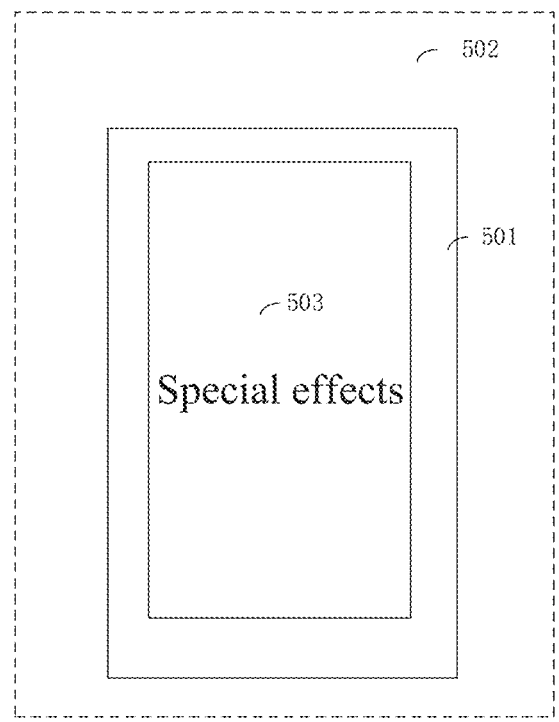
FIG. 5 is a schematic diagram of a zooming-in display provided by an embodiment of the disclosure.
Figure 6:
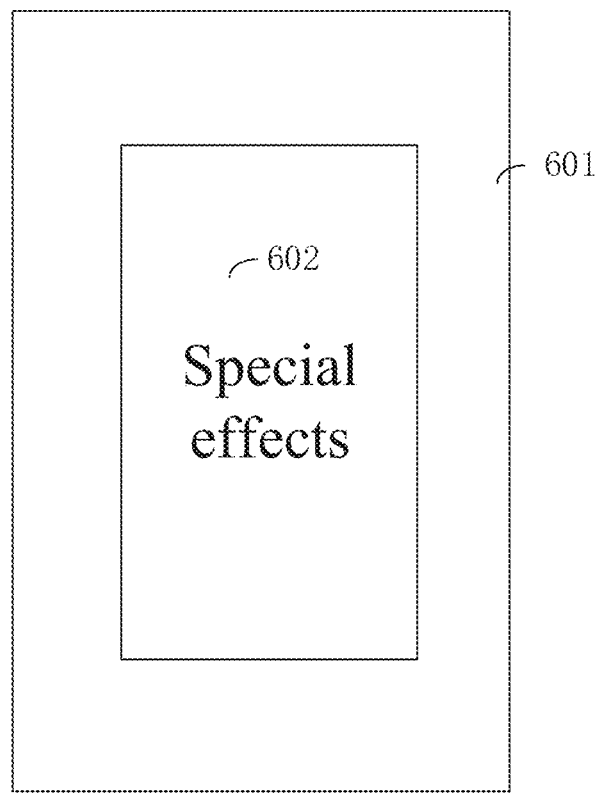
FIG. 6 is a schematic diagram of a zooming-out display provided by an embodiment of the present disclosure.

For the embodiments of the present disclosure, for convenience of description, a specific embodiment is taken as an example. In an audio diagram of certain music as illustrated in FIG. 4, the features of the music include start points D, E of accented beats; optionally, displaying the special effects based on the musical features includes zooming out and zooming in on the special effect display interface at the start points of the accented beats. As an embodiment of the present disclosure, as illustrated in FIG. 4, when the music is played to the start point D of the accented beat, zooming in is performed on the special effect display interface for display. Optionally, as illustrated in FIG. 5, when zooming in is performed on a picture in the special effect display interface for display, an excess area 502 outside a screen area 501 is not displayed, and a special effect display area 503 within the screen area is displayed. As another embodiment of the present disclosure, when the music is played to a final start point E, zooming out is performed on the special effect display interface for display; optionally, as illustrated in FIG. 6, zooming out is performed on a special effect picture 602 in the special effect display interface 601 for display. Optionally, display time of the zooming in or zooming out of the special effect display interface may be preset, or may be related to the durations of the accented beats.

The embodiment of the present disclosure, by zooming in or zooming out on the special effect display interface based on the start points of the accented beats of the music, gives the user a strong visual impact, thereby providing better user experience.

An embodiment of the present disclosure provides a possible implementation manner. In this implementation manner, the musical features include tones of the accented beats, and the method further includes: adjusting an amplitude of the zooming in or zooming out of the content displayed on the special effect display interface based on the tone of each of the at least one accented beat.

In the embodiment of the present disclosure, the musical features may be tones of the accented beats, and said displaying the special effects on the special effect display interface based on the musical features may include adjusting an amplitude of the zooming in or zooming out on the special effect display interface based on the tone of each of at least one accented beat.

For the embodiments of the present disclosure, for convenience of description, the above specific embodiment is taken as an example. The tone of an accented beat of music may be an average tone of the accented beat. Zooming out or zooming on the special effect display interface at the start point of the accented beat may include adjusting an amplitude of the zooming in or zooming out of the special effect display interface based on the level of the average tone; optionally, the amplitude of the zooming in or zooming out on the special effect display interface increases as the average tone rises; and the amplitude of the zooming in or zooming out on the special effect display interface decreases as the average tone drops.

In the embodiment of the present disclosure, by adjusting the amplitude of the zooming in or zooming out on the special effect display interface based on the tone of the accented beat, the display of the special effects is associated to the musical features, and the user's visual and auditory feelings are combined, thereby providing better experience.

The embodiment of the present disclosure provides a possible implementation manner. In this implementation manner, the special effects include at least one animation element layer and one color change layer, and the at least one animation element layer and the color change layer are fused by color filtering or superimposition.

In an embodiment of the present disclosure, the special effects may include at least one animation element layer and one color change layer, each animation element layer may include one or more animation elements, and colors in the color change layer can be changed according to preset rules.

Figure 7:
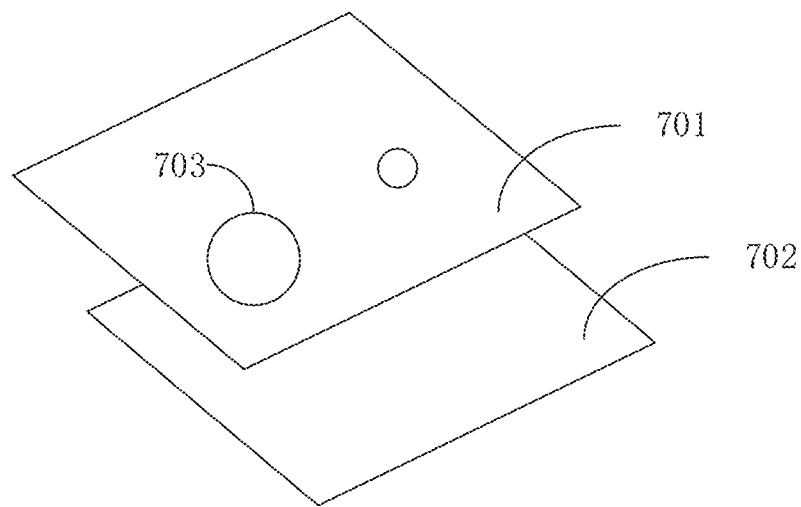
FIG. 7 is a schematic diagram of composition of special effects provided by an embodiment of the present disclosure.

For the embodiments of the present disclosure, for convenience of description, a specific embodiment is taken as an example. As illustrated in FIG. 7, when the special effects are constructed, the special effects include one animation element layer 701 and one color change layer 702. Optionally, the animation element layer can include one or more animation light spots 703. The colors in the color change layer can change over time; optionally, the colors in the color change layer can change over time according to a preset color spectrum (e.g., changing repeatedly). As an embodiment of the present disclosure, displaying the special effects may include fusing the one animation layer and the one color change layer by color filtering or superimposition, for display. Optionally, a plurality of animation element layers may be included. Optionally, the animation light spots in the animation element layer can be randomly combined, and the color spectrum in the color change layer can also be randomly generated.

The special effects of the embodiment of the present disclosure includes an animation element layer and a color change layer, and through the random combination of a plurality of special effect elements, the special effect styles are diversified.

The embodiment of the present disclosure provides a possible implementation manner. In this implementation manner, the musical features include beats of the music, and said displaying the special effects on the special effect display interface based on the musical features includes: playing the special effects at start points of the beats of the music, where for two adjacent beats, the at least one animation element layer of the special effects corresponding to one beat is different from the at least one animation element layer of the special effects corresponding to the other beat.

In the embodiment of the present disclosure, playing the special effects includes playing the special effects at the start point of each of the beats, optionally, for every two consecutive beats, the special effects played at the start point of one beat are different from the special effects played at the start point of the other beat, and optionally, the animation element layer corresponding to the special effects played at the start point of one beat is different from the animation element layer corresponding to the special effects played at the start point of the other beat.

For the embodiments of the present disclosure, for convenience of description, a specific embodiment is taken as an example. When the music is being played, the animation element layer in the special effects for the start point of the first beat of the music can be animation light spot 1; the animation element layer in the special effects at the start point of the second beat can be light spot animation 2; the animation element in the special effect elements at the start point of the third beat can be a combination of light spot animation 3 and light spot animation 4, optionally, a combination of a random quantity of random light spot animations.

In the embodiment of the present disclosure, by adjusting the difference of the animation element layer in the special effects, it is ensured that the special effects displayed in the special effect display interface change with the change of the music, and the randomness of the light spot animations in the animation element layer ensures the randomness of the special effects.

Figure 8:
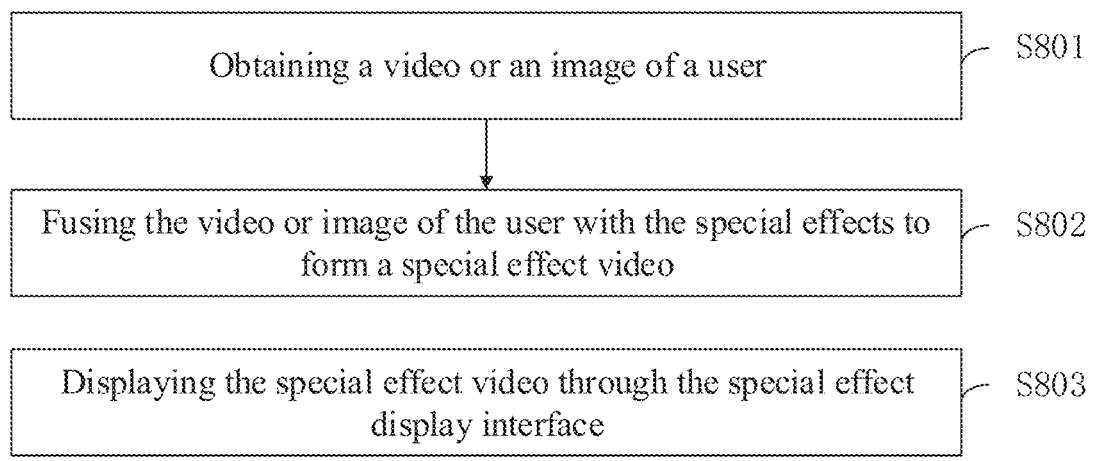
FIG. 8 is a schematic flowchart of a method for displaying a video or image of a user provided by an embodiment of the present disclosure.

The embodiment of the present disclosure provides a possible implementation manner. In this implementation manner, as illustrated in FIG. 8, the method further includes: step S801, obtaining a video or an image of a user; step S802, fusing the video or image of the user with the special effects to form a special effect video; and step S803, displaying the special effect video through the special effect display interface.

In the embodiment of the present disclosure, when playing music, the user can choose to display the selected video or image on the special effect display interface, and combine the selected video or image with the special effects for display.

Figure 9:
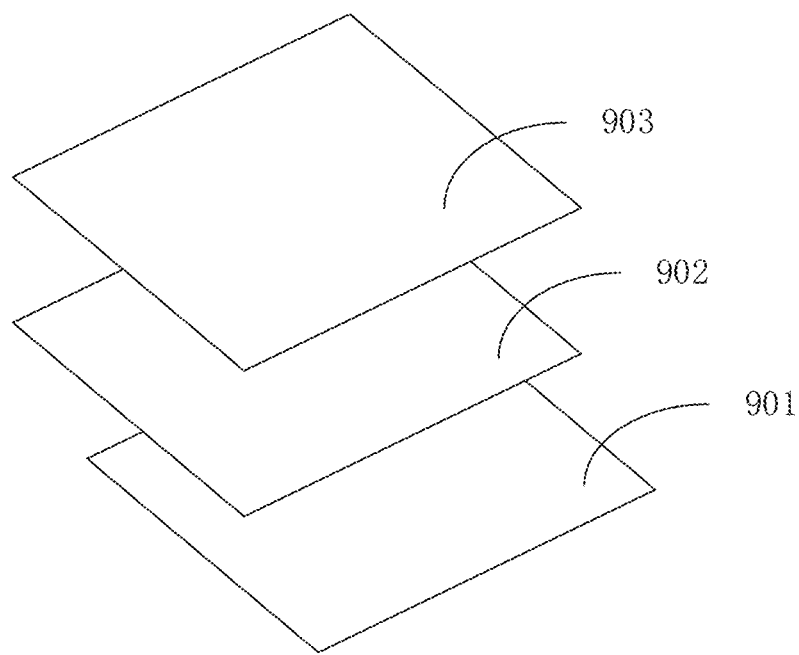
FIG. 9 is a schematic diagram of a special effect display for displaying a video or image of a user provided by an embodiment of the present disclosure.

For the embodiments of the present disclosure, for convenience of description, a specific embodiment is taken as an example. As illustrated in FIG. 9, the display content of the special effect display interface includes a video image layer 901, a color change layer 902, and an animation element layer 903, where the video image layer includes the video or image selected by the user. Displaying special effects includes fusing the video image layer, the color change layer, and the animation element layer in an superimposition or color-filtering manner, and playing the fused video or image. Optionally, displaying the special effects may include extracting musical features when the music is being played, generating the special effects based on the musical features, and superimposing the special effects on the user video or image for real-time display.

In the embodiment of the present disclosure, by obtaining the user video or image, and combining the user video or image with the special effects for display, the user can add special effects to the video or image selected by herself or himself, and the special effects are associated to the rhythm of the music, thereby increasing user experience.

In the embodiment of the present disclosure, by obtaining the musical features of the music, and generating the special effects based on the musical features on the special effects display interface for display, the change of the display of the special effects is related to the musical features, the display of the special effects is more diverse, and the special effects are combined with the musical features, thereby increasing the users immersive experience.

Figure 10:
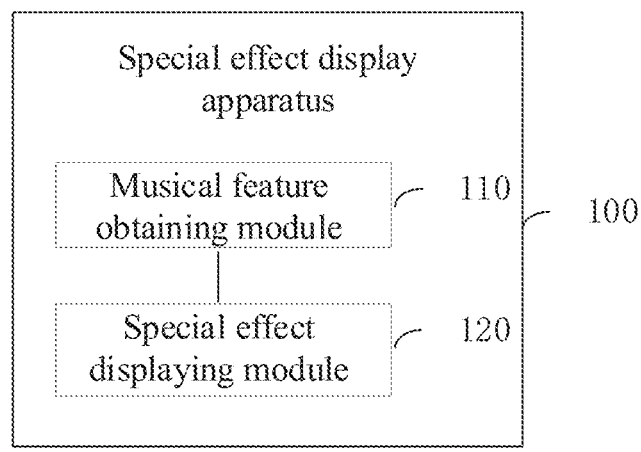
FIG. 10 is a schematic diagram of a special effect display apparatus provided by an embodiment of the present disclosure.

The embodiment of the present disclosure provides a special effect display apparatus. As illustrated in FIG. 10, the special effect display apparatus 100 includes a musical feature obtaining module 110 and a special effect displaying module 120.

The musical feature obtaining module 110 is configured to obtain musical features of music played in a special effect display interface.

The special effect displaying module 120 is configured to display special effects on the special effect display interface based on the musical features.

Optionally, the musical features include beats of the music, and when displaying the special effects on the special effect display interface based on the musical features, the special effect displaying module 120 can be configured to play the special effects at a start point of each of at least one beat of the music.

Optionally, the musical features include start points of accented beats, and the special effect display apparatus can also be configured to zoom out or zoom in on a content displayed on the special effect display interface at a start point of each of at least one accented beat.

Optionally, the musical features include tones of the accented beats, and the special effect displaying module 120 can be further configured to adjust an amplitude of the zooming in or zooming out on the content displayed on the special effect display interface based on a tone of each of the at least one accented beat.

Optionally, the special effects include at least one animation element layer and one color change layer, and the at least one animation element layer and the color change layer are fused by superimposition or color filtering.

Optionally, the musical features include beats of the music, and when displaying the special effects on the special effect display interface based on the musical features, the special effect displaying module 120 can be configured to play the special effects at the start points of the beats of the music, where for two adjacent beats, the at least one animation element layer of the special effects corresponding to one beat is different from the at least one animation element layer of the special effects corresponding to the other beat.

Optionally, the special effect display module 120 can also be configured to obtain a video or an image of a user, fuse the video or image of the user with the special effects to form a special effect video, and display the special effect video through the special effect display interface.

The special effect display apparatus of the embodiment of the present disclosure can execute the method illustrated in the foregoing embodiment of the present disclosure, and its implementation principle is similar, and will not be repeated here.

Figure 11:
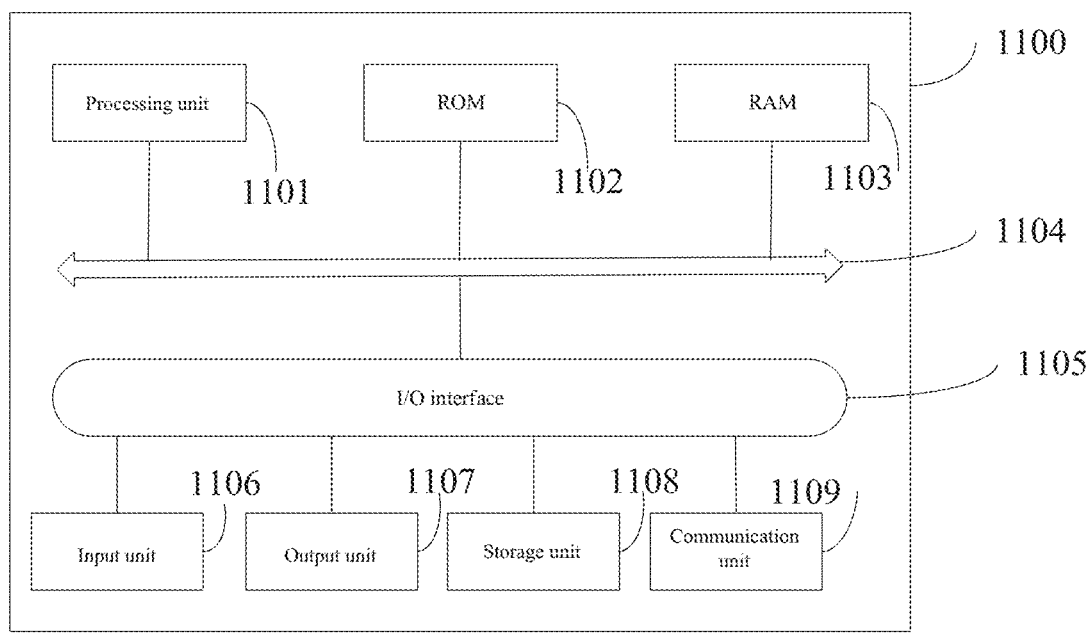
FIG. 11 is a structural schematic diagram of an electronic device provided by an embodiment of the disclosure.

Reference is now made to FIG. 11, which is a structural schematic diagram of an electronic device 1100 adapted to implement the embodiments of the present disclosure. The terminal device according to the embodiments of the present disclosure may include, but is not limited to, a mobile terminal such as a mobile phone, a laptop computer, a digital broadcast receiver, a Personal Digital Assistant (PDA), a tablet computer or PAD, a Portable Multimedia Player (PMP), or a vehicle-mounted terminal (e.g., a vehicle-mounted navigation terminal), or a fixed terminal such as a digital TV, a desktop computer, etc. The electronic device illustrated in FIG. 11 is exemplary only, and should not be construed as limiting the function and scope of use of the embodiments of the present disclosure.

The electronic device includes a memory and a processor, where the processor here may be referred to as the processing unit 1101 below, and the memory may include at least one of a read-only memory (ROM) 1102, a random access memory (RAM) 1103, and a storage unit 1108 below, as illustrated in detail below:

As illustrated in FIG. 11, the electronic device 1100 may include a processing unit (such as a central processing unit, a graphics processing unit, etc.) 1101, which may perform various appropriate actions and processes in accordance with programs stored in a Read Only Memory (ROM) 1102 or loaded from a storage unit 1108 into a Random Access Memory (RAM) 1103. In the RAM 1103, various programs and data required for the operation of the electronic device 1100 may also be stored. The processing unit 1101, the ROM 1102, and the RAM 1103 are connected to each other through a bus 1104. An input/output (I/O) interface 1105 is also connected to the bus 1104.

Generally, the following units may be connected to the I/O interface 1105: an input unit 1106 including, for example, a touch screen, a touch pad, a keyboard, a mouse, a camera, a microphone, an accelerometer, a gyroscope, etc.; an output unit 1107 including, for example, a Liquid Crystal Display (LCD), a speaker, an oscillator, etc.; a storage unit 1108 including, for example, a magnetic tape or a hard disk, etc.; and a communication unit 1109. The communication unit 1109 may allow the electronic device 1100 to perform wireless or wired communication with other devices for data exchange. Although FIG. 11 illustrates the electronic device 1100 having various apparatuses, it can be appreciated that it is not necessary to implement or provide all the illustrated apparatuses. Alternatively, more or fewer apparatuses may be implemented or provided.

In particular, according to the embodiment of the present disclosure, the processes described above with reference to the flowcharts may be implemented as computer software programs. For example, an embodiment of the present disclosure includes a computer program product, which includes a computer program carried on a non-transitory computer readable medium. The computer program includes program codes for implementing the method illustrated in any of the flowcharts. In these embodiments, the computer program may be downloaded and installed from a network through the communication unit 1109, or installed from the storage unit 1108, or installed from the ROM 1102. When the computer program is executed by the processing unit 1101, the above functions defined in the methods according to the embodiments of the present disclosure are performed.

It is to be noted that the above computer-readable medium in the present disclosure may be a computer-readable signal medium or a computer-readable storage medium or any combination thereof. The computer-readable storage medium may be, but not limited to an electrical, magnetic, optical, electromagnetic, infrared, or semiconductor system, apparatus, or device, or any combination thereof. More specific examples of the computer-readable storage medium may include, but not limited to: an electrical connection having one or more wires, a portable computer disk, a hard disk, a Random Access Memory (RAM), a Read Only Memory (ROM), an Erasable Programmable Read Only Memory (EPROM) or a flash memory, an optical fiber, a Compact Disc Read-Only Memory (CD-ROM), an optical memory device, a magnetic memory device, or any suitable combination thereof. In the present disclosure, the computer-readable storage medium may be any tangible medium including or storing programs, which may be used by or used with an instruction execution system, apparatus, or device. However, in the present disclosure, the computer-readable signal medium may include a data signal propagated in a baseband or as a part of a carrier that carries computer-readable program codes. Such propagated data signal may be in various forms, including but not limited to an electromagnetic signal, an optical signal, or any suitable combination thereof. The computer-readable signal medium may also be any computer-readable medium other than the computer-readable storage medium, which may transmit, propagate, or transfer programs used by or used with an instruction execution system, apparatus or device. The program codes contained on the computer-readable medium may be transmitted via any appropriate medium, including but not limited to electric cable, optical cable, Radio Frequency (RF), etc., or any suitable combination thereof.

In some embodiments, the client and server can communicate with any currently known or future-developed network protocol such as HTTP (HyperText Transfer Protocol), and can be interconnected with any form or medium of digital data communication (for example, communication network). Examples of communication networks include local area networks ("LAN"), wide area networks ("WAN"), the Internet (for example, the Internet), and end-to-end networks (for example, ad hoc end-to-end networks), as well as any networks currently known or developed in the future.

The above computer-readable medium may be included in the above electronic device; or may be standalone without being assembled into the electronic device.

The above computer-readable medium carry one or more programs which, when executed by the electronic device, cause the electronic device to: obtain musical features of music played in a special effect display interface, and display special effects on the special effect display interface based on the musical features.

The computer program code used to perform the operations of this disclosure can be written in one or more programming languages or a combination thereof. The above programming languages include but are not limited to object-oriented programming languages such as Java, Smalltalk, C++, and include conventional procedural programming languages such as "C" language or similar programming languages. The program code can be executed entirely on the user's computer, partly on the user's computer, executed as an independent software package, partly on the user's computer and partly executed on a remote computer, or entirely executed on the remote computer or server. In the case of a remote computer, the remote computer can be connected to the user's computer through any kind of network, including a local area network (LAN) or a wide area network (WAN), or it can be connected to an external computer (for example, using an Internet service provider to pass Internet connection).

The flowcharts and block diagrams in the drawings illustrate the possible implementations of the system architecture, functions, and operations of the system, method, and computer program product according to various embodiments of the present disclosure. In this regard, each block in the flowcharts or block diagrams may represent a module, a program segment, or a part of code, and the module, the program segment, or the part of code contains one or more executable instructions for implementing the specified logic function. It should also be noted that, in some alternative implementations, the functions marked in the block may also occur in a different order from the order marked in the drawings. For example, two blocks illustrated in succession can actually be executed substantially in parallel, and they can sometimes be executed in a reverse order, depending on the functions involved. It should also be noted that each block in the block diagrams and/or flowcharts, and the combination of the blocks in the block diagrams and/or flowcharts, can be implemented by a dedicated hardware-based system that performs the specified functions or operations or can be implemented by a combination of dedicated hardware and computer instructions.

The modules or units involved in the embodiments described in the present disclosure can be implemented in software or hardware.

The functions described herein above may be performed at least in part by one or more hardware logic components. For example, without limitation, exemplary types of hardware logic components that can be used include: Field Programmable Gate Array (FPGA), Application Specific Integrated Circuit (ASIC), Application Specific Standard Product (ASSP), System on Chip (SOC), Complex Programmable Logic Device (CPLD), etc.

In the context of the present disclosure, a machine-readable medium may be a tangible medium including or storing programs, which may be used by or used with an instruction execution system, apparatus, or device. The machine-readable medium may be a machine-readable signal medium or a machine-readable storage medium. The machine-readable medium may be, but not limited to an electrical, magnetic, optical, electromagnetic, infrared, or semiconductor system, apparatus, or device, or any suitable combination thereof. More specific examples of the machine-readable storage media may include an electrical connection having one or more wires, a portable computer disk, a hard disk, a Random Access Memory (RAM), a Read Only Memory (ROM), an Erasable Programmable Read Only Memory (EPROM or a flash memory), an optical fiber, a Compact Disc Read-Only Memory (CD-ROM), an optical memory device, a magnetic memory device, or any suitable combination thereof.

According to one or more embodiments provided in the present disclosure, a special effect display method is provided, the method including: obtaining musical features of music played in a special effect display interface; and displaying special effects on the special effect display interface based on the musical features.

Optionally, the musical features include beats of the music, and said displaying the special effects on the special effect display interface based on the musical features includes playing the special effects at a start point of each of at least one beat of the music.

Optionally, the musical features include start points of accented beats, and the method further includes zooming out or zooming in on a content displayed on the special effect display interface at a start point of each of at least one accented beat of the music.

Optionally, the musical features include tones of the accented beats, and the method further includes adjusting an amplitude of the zooming in or zooming out on the content displayed on the special effect display interface based on a tone of each of the at least one accented beat.

Optionally, the special effects include at least one animation element layer and one color change layer, and the at least one animation element layer and the color change layer are fused by superimposition or color filtering.

Optionally, the musical features include beats of the music, and said displaying the special effects on the special effect display interface based on the musical features includes playing the special effects at start points of the beats of the music, where for two adjacent beats, the animation element layer of the special effects corresponding to one beat of the two adjacent beats is different from the animation element layer of the special effects corresponding to the other beat of the two adjacent beats.

Optionally, the method further includes obtaining a video or an image of a user, fusing the video or image of the user with the special effects to form a special effect video; and displaying the special effect video through the special effect display interface.

According to one or more embodiments provided in the present disclosure, a special effect display apparatus is provided, the special effect display apparatus including: a musical feature obtaining module configured to obtain musical features of music played in a special effect display interface; and a special effect displaying module configured to display special effects on the special effect display interface based on the musical features.

Optionally, the musical features include beats of the music, and when displaying the special effects on the special effect display interface based on the musical features, the special effect displaying module can be configured to play the special effects at a start point of each of at least one beat of the music.

Optionally, the musical features include start points of accented beats, and the special effect displaying module can be further configured to zoom out or zoom in on a content displayed on the special effect display interface at a start point of each of at least one accented beat of the music.

Optionally, the musical features include tones of the accented beats, and the special effect displaying module can be further configured to adjust an amplitude of the zooming in or zooming out on the content displayed on the special effect display interface based on a tone of each of the at least one accented beat.

Optionally, the special effects include at least one animation element layer and one color change layer, and the at least one animation element layer and the color change layer are fused by superimposition or color filtering.

Optionally, the musical features include beats of the music, and when displaying the special effects on the special effect display interface based on the musical features, the special effect displaying module can be configured to play the special effects at start points of the beats of the music, where for two adjacent beats, the at least one animation element layer of the special effects corresponding to one beat of the two adjacent beats is different from the at least one animation element layer of the special effects corresponding to the other beat of the two adjacent beats Optionally, the special effect display apparatus can be further configured to obtain a video or an image of a user, fuse the video or image of the user with the special effects to form a special effect video; and display the special effect video through the special effect display interface.

According to one or more embodiments provided in the present disclosure, an electronic device is provided, the electronic device including: a processor; and a memory having at least one instruction, at least one segment program, a code set, or an instruction set stored thereon, where the at least one instruction, the at least one segment program, the code set, or the instruction set is loaded and executed by the processor to implement the above special effect display method.

According to one or more embodiments provided in the present disclosure, a computer-readable medium is provided, the computer-readable medium having a computer program stored thereon, the computer program, when executed by a processor, implementing the above special effect display method.

The above description is only preferred embodiments of the present disclosure and an explanation of the applied technical principles. Those skilled in the art should understand that the scope of disclosure involved in the present disclosure is not limited to the technical solutions formed by the specific combination of the above technical features, and should also cover other technical solutions formed by any combination of the above technical features or their equivalent features without departing from the above disclosed concept, e.g., technical solutions formed by mutually replacement of the above features and the technical features disclosed in the present disclosure (but not limited to) with similar functions.

In addition, although the operations are depicted in a specific order, this should not be understood as requiring these operations to be performed in the specific order shown or performed in a sequential order. Under certain circumstances, multitasking and parallel processing may be advantageous. Likewise, although several specific implementation details are included in the above discussion, these should not be construed as limiting the scope of the disclosure. Certain features that are described in the context of separate embodiments can also be implemented in combination in a single embodiment. Conversely, various features described in the context of a single embodiment can also be implemented in a plurality of embodiments individually or in any suitable sub-combination.

Although the subject matter has been described in language specific to structural features and/or logical actions of the method, it should be understood that the subject matter defined in the appended claims is not necessarily limited to the specific features or actions described above. On the contrary, the specific features and actions described above are merely exemplary forms of implementing the claims.

What is claimed is:

1. An effect display method, applied to a terminal, comprising:
 obtaining musical features of music played in an effect display interface, wherein the musical features comprise beats of the music and accented beats of the music, and the accented beats are beats whose tones are higher than a preset threshold;
 displaying effects on the effect display interface based on the musical features, wherein said displaying effects on the effect display interface based on the musical features comprises starting to play the effects at a start point of at least one beat of the music, durations of the effects being durations of beats corresponding to the effects; and
 starting to zoom out or zoom in, by the terminal, on a content displayed on the effect display interface at a start point of each of at least one accented beat of the music.

2. The effect display method according to claim 1, wherein display time of the zooming in or zooming out of the content displayed on the effect display interface is related to durations of the accented beats.

3. The effect display method according to claim 1, wherein the musical features comprise tones of the accented beats, and the method further comprises:
 adjusting an amplitude of the zooming in or zooming out on the content displayed on the effect display interface based on a tone of each of the at least one accented beat.

4. The effect display method according to claim 3, wherein the tone of each of the at least one accented beat is an average tone of each of the at least one accented beat, and said adjusting the amplitude of the zooming in or zooming out on the content displayed on the effect display interface based on the tone of each of the at least one accented beat comprises:
 increasing the amplitude of the zooming in or zooming out on the content displayed on the effect display interface as a level of the average tone rises; and
 decreasing the amplitude of the zooming in or zooming out on the content displayed on the effect display interface as the level of the average tone drops.

5. The effect display method according to claim 1, wherein the effects comprise at least one animation element layer and a color change layer, and the at least one animation element layer and the color change layer are fused by superimposition or color filtering.

6. The effect display method according to claim 5, wherein the musical features comprise beats of the music, and said displaying the effects on the effect display interface based on the musical features comprises:
 playing the effects at start points of the beats of the music, wherein for two adjacent beats of the beats, the at least one animation element layer of the effects corresponding to one beat of the two adjacent beats is different from the at least one animation element layer of the effects corresponding to the other beat of the two adjacent beats.

7. The effect display method according to claim 1, further comprising:
 obtaining a video or an image of a user,
 fusing the video or image of the user with the effects to form an effect video; and
 displaying the effect video through the effect display interface.

8. The effect display method according to claim 1, wherein contents displayed on the effect display interface comprise: a video image layer, a color change layer, and an animation element layer.

9. The effect display method according to claim 1, wherein durations of the effects are durations of corresponding beats.

10. The effect display method according to claim 1, wherein the accented beats are beats whose tones are higher than a preset threshold.

11. An effect display apparatus, applied to a terminal, comprising:
a musical feature obtaining module configured to obtain musical features of music played in an effect display interface, wherein the musical features comprise beats of the music and accented beats of the music, and the accented beats are beats whose tones are higher than a preset threshold;
an effect displaying module configured to display effects on the effect display interface based on the musical features, wherein displaying effects on the effect display interface based on the musical features comprises starting to play the effects at a start point of at least one beat of the music, durations of the effects being durations of beats corresponding to the effects, and the effect displaying module is further configured to start to zoom out or zoom in on a content displayed on the effect display interface at a start point of each of at least one accented beat of the music.

12. The effect display apparatus according to claim 11, wherein the musical features comprise tones of the accented beats, and the effect displaying module is configured to:
adjust an amplitude of the zooming in or zooming out on the content displayed on the effect display interface based on a tone of each of the at least one accented beat.

13. An electronic device, comprising:
a processor; and
a memory having at least one instruction, at least one program, a code set, or an instruction set stored thereon, wherein the at least one instruction, the at least one program, the code set, or the instruction set is loaded and executed by the processor to implement the effect display method according to claim 1.

14. The electronic device according to claim 13, wherein display time of the zooming in or zooming out of the content displayed on the effect display interface is related to durations of the accented beats.

15. The electronic device according to claim 13, wherein the effects comprise at least one animation element layer and a color change layer, and the at least one animation element layer and the color change layer are fused by superimposition or color filtering.

16. The electronic device according to claim 13, further comprising:
obtaining a video or an image of a user;
fusing the video or image of the user with the effects to form an effect video; and
displaying the effect video through the effect display interface.

17. The electronic device according to claim 13, wherein the musical features comprise tones of the accented beats, and the method further comprises:
adjusting an amplitude of the zooming in or zooming out on the content displayed on the effect display interface based on a tone of each of the at least one accented beat.

18. A non-transitory computer-readable medium having a computer program stored thereon, the computer program, when executed by a processor, causes the processor to:
obtain musical features of music played in an effect display interface, wherein the musical features comprise beats of the music and accented beats of the music, and the accented beats are beats whose tones are higher than a preset threshold;
display effects on the effect display interface based on the musical features, wherein displaying effects on the effect display interface based on the musical features comprises starting to play the effects at a start point of at least one beat of the music, durations of the effects being durations of beats corresponding to the effects; and
start to zoom out or zoom in on a content displayed on the effect display interface at a start point of each of at least one accented beat of the music.

19. The non-transitory computer-readable medium according to claim 18, wherein the musical features comprise tones of the accented beats, and the computer program, when executed by the processor, causes the processor to:
adjust an amplitude of the zooming in or zooming out on the content displayed on the effect display interface based on a tone of each of the at least one accented beat.

* * * * *